Nov. 22, 1932. F. TRAVERSO 1,888,519

ELASTIC SUSPENSION

Filed April 23, 1930

Inventor:
F. Traverso
By: Marks & Clerk
Attorneys

Patented Nov. 22, 1932

1,888,519

UNITED STATES PATENT OFFICE

FRANCESCO TRAVERSO, OF GENOA, ITALY

ELASTIC SUSPENSION

Application filed April 23, 1930, Serial No. 446,709, and in Italy May 31, 1929.

The present invention relates to an elastic suspension which presents certain characteristics of operation differing from known constructions.

The present invention involves the use of a coiled preferably helical spring which, when in loaded condition, has a substantially rectilinear axis disposed substantially normal to the directions of the load and the reaction Under ordinary loading the coils of the spring are preferably in contact. In practice, under additional loading or shock, the spring is deflected, the axis being bent so that the metal of the spring is subjected both to torsion and to bending stresses in addition to tension or compression stresses.

The spring may be assembled in different ways, either so as to remove substantially all the stresses except that of torsion, or as to allow for the development of stresses of bending, torsion and compression.

The advantages which may be obtained by the present invention will be practically and chiefly as follows:—ability to react simultaneously to thrust (loads) and shocks in every direction; possibility of every such spring of the system reacting independently of the other springs of the system; apportionment of the deformation, caused either by substantially dead loads or by loads substantially dynamic upon the several coils of the same spring, obtaining therefore the possibility of much more moderate reaction, and, for equal deflection, more considerable reaction; possibility of predisposing the helix according to which the wire or rod is wound in manner to obtain a stress nearly uniform in the several elements into which the spring may be imagined to be subdivided, obtaining consequently a system of suspension which, as compared with other types, under like conditions, is less cumbersome and of less weight.

Figures 1, 2:
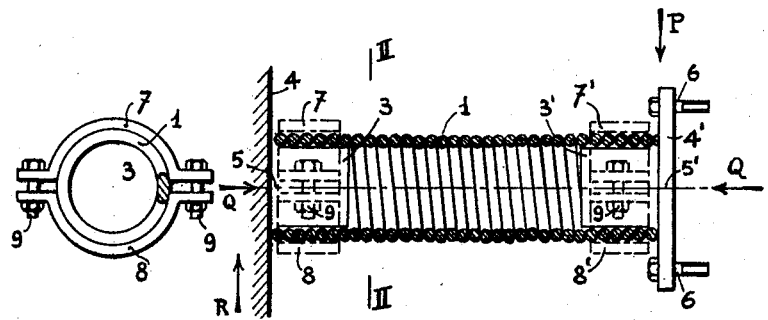
Figure 3:
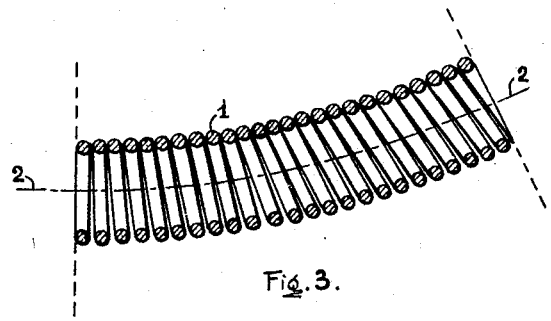
Figure 4:
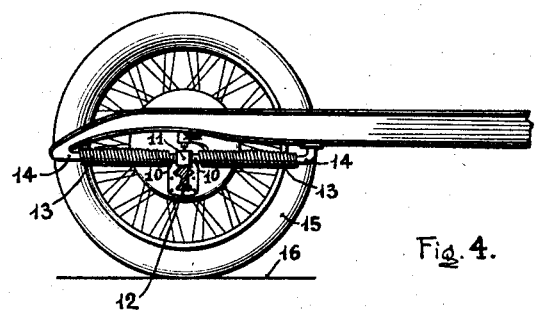

The invention is illustrated by way of example in the accompanying drawing in which Fig. 1 is a part elevation part axial section showing a suspension spring in loaded condition; Fig. 2 is a transverse section on the line II—II of Fig. 1; Fig. 3 is an axial section showing the spring in free condition; Fig. 4 shows the application of the invention to the suspension system of an automobile.

Referring to the drawing, the suspension spring 1 is of the helical wire type and is constructed so that when in free condition it has a curved axis 2—2, as shown in Fig. 3, the coils on the arc of smaller radius being in contact while the coils on the arc of larger radius are equally spaced apart. Fitted into one end of the spring 1 is a cylindrical plug 3 (Figs. 1 and 2) of suitable length. This plug 3 may be an easy fit within the spring or it may be a driving fit therein. The plug 3 may be hollow in which event the corresponding end of the spring would be received in the socket presented by the plug, said socket being an easy or a driving fit for the end of the spring. The other end of the spring is engaged in like manner by a plug 3', the plugs 3, 3' being unitary with members 4, 4' respectively, of which the member 4' is acted upon by a load P while to the member 4 is applied in the opposite direction the reaction load R. Under normal loading the axis 2—2 (Fig. 3) of the spring becomes substantially rectilinear as represented by the line 5—5' (Fig. 1) so that the coils of the spring are in complete contact as shown in Fig. 1. To ensure that the spring is solid when in loaded condition axial compression (Q) may be applied to the spring through the members 4—4'. The load P is applied to the member 4' through the bolts 6, the load P being substantially normal to the axis 5—5'. While the spring is in the condition shown in Fig. 1, additional loading normal to the axis 5—5' will effect further compression of the coils at the lower side of the spring while the coils will be separated at the upper side of the spring, the several coils taking up their share of the load and reacting when relieved to restore the spring to Fig. 1 condition.

As the relative movement of the members 4', 4 will be generally normal to the axis 5—5', it will result that, if the ends of the spring are not fixed to the plugs 3—3', the springs may move on said members. To obviate this contingency the ends of the spring may be fixed to the plugs 3—3′ in suitable manner, for instance, by means of clamps 7, 8 and 7′, 8′ secured by bolts 9, the spring being thus subjected to tension, in addition to other deformation, on separation of the members 4, 4′.

The arrangement shown in Figs. 1–3 is purely conventional to illustrate the principle of the invention it being understood that the principle may, in practice, be applied in many ways. For example, Fig. 4 shows two such springs as shown in Figs. 1–3 used in connection with the suspension of an automobile. As shown, adjacent ends (10) of the springs are engaged by a block 11 fixed to the axle 12 of the vehicle, while the remote ends 13 of the springs are engaged by members 14 on the chassis, shocks from the road wheel 15 being thus taken up by the springs. Additional springs may be arranged in parallel, in series, or in series-parallel arrangement. The springs aforesaid may be combined with springs of known types, for instance, with semi-elliptical, or quarter-elliptical springs or helical springs, working with stresses in axial direction. Suitable shock absorbing devices may be associated, where necessary, with the springs, to limit the deflection of the springs.

Having now particularly described and ascertained the nature of my said invention and in what manner the same is to be performed, I declare that what I claim is:

1. Elastic suspension for vehicles and other purposes including at least one helical or coil spring, the coils of each spring being always in contact with each other at least at one point of their annular length.

2. Elastic suspension for vehicles or other purposes including a helicoidal spring the coils of which are always in contact with each other at least at one point of their length, the axis of the spring under load being rectilinear and bent when the load is removed.

3. Elastic suspension for vehicles or other purposes including a helicoidal spring the coils thereof being always in contact at least at one point, and the axis of the loaded spring being rectilinear, whereas said axis is bent when the load is removed, and lies in the plane including the applied force and the reaction when the spring is mounted without any load; the elastic suspension including also means located at least at one end of the spring, capable of preventing the spring from rotating around its axis during the application of the load.

4. Elastic suspension for vehicles or other purposes, including a helical spring the coils of which are always in contact with each other at least in one direction, the load being directed perpendicularly to the axis of the spring.

5. In an elastic suspension, a helical spring the successive coils of which are always in contact with each other for a portion of their annular length when under partial loading, and when under full load said successive coils are in complete contact with each other.

6. In an elastic suspension means, a helical spring the axis of which is rectilinear, when under full load, and is curved when under a partial loading, comprising a series of successive coils which when under load are in complete annular contact with each other, and when the load is removed, said coils contact each other for a portion of their annular length.

7. In an elastic suspension for vehicles, having an axle and a body frame, a helical spring the successive coils of which are always in contact with each other for a portion of their annular length, and the central axis of which is curved when in a normally quiescent position, and approaches a horizontal position as the load is increased, with the successive coils of the spring in full annular contact with each other, and means on the frame and on the axle for securing the ends of the spring to the said respective parts.

FRANCESCO TRAVERSO.